Sept. 26, 1950     F. H. CALDWELL     2,523,679
SAFETY SNAP FOR FISHING TACKLE
Filed Dec. 10, 1948
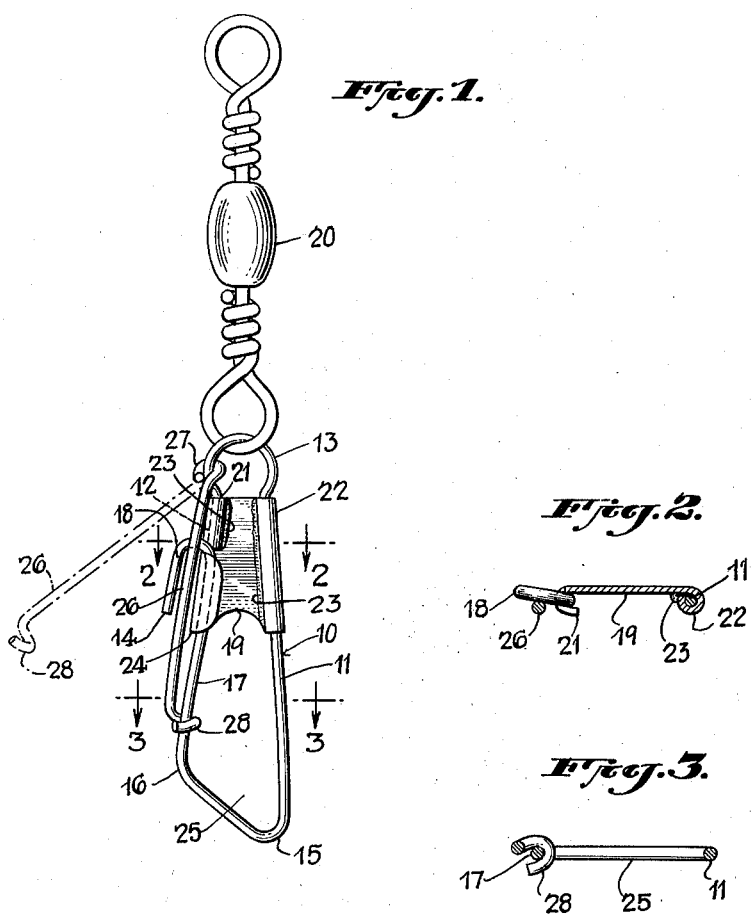
INVENTOR.
FERRIS H. CALDWELL.
BY Ward, Crosby & Neal
ATTORNEYS.

Patented Sept. 26, 1950

2,523,679

UNITED STATES PATENT OFFICE 2,523,679

SAFETY SNAP FOR FISHING TACKLE

Ferris H. Caldwell, Canton, N. Y.

Application December 10, 1948, Serial No. 64,557

2 Claims. (Cl. 24—241)

This invention relates to snap fasteners particularly adapted, among other possibilities, for use in connection with fishing tackle for releasably securing plugs, hooks and other devices to fishing lines.

Snap fasteners of this general class usually comprise a single strand of wire having a main body portion, the upper end of which is formed into an eye or loop which, for example, may be connected to a swivel type of coupler. The other end of the main body portion is provided with a return bend to form a resilient locking portion. A guard or keeper embraces the opposite sides of the fastener and serves to close the loops at the top and bottom thereof. The spring tension inherent in the locking portion releasably maintains the lower loop in a closed position against the guard or keeper, thus providing a fastener for plugs, hooks and the like. This arrangement has not proven entirely satisfactory in practice, however, for the reason that at the strike of a fish, for example, the wire may become straightened and the locking portion disengaged from the guard or keeper, whereby the fish and equipment carried by the fastener may be lost.

In accordance with the present invention, this disadvantage is overcome by the provision of a supplemental strand of wire pivotally mounted in the upper loop of the fastener. This strand is provided with a laterally formed hook at the free end thereof adapted to engage the inner surface of the locking portion and exert a force thereon in a direction to more securely maintain the locking portion in its closed position.

Various further and more specific objects, features and advantages of the invention will appear from the description given below taken in connection with the accompanying drawing illustrating, by way of example, the preferred form of the invention. The invention consists in such novel features and combinations as may be shown and described in connection with the example of the invention herein disclosed.

In the drawing:

Fig. 1 is a view in elevation of a snap fastener constructed in accordance with the present invention;

Fig. 2 is a view in section taken along the line 2—2 of Fig. 1; and

Fig. 3 is a sectional view taken along the line 3—3 of Fig. 1.

Referring now to the drawing, 10 generally indicates a strand of wire having a main body portion 11 and whose upper end 12 is bent back to form a yoke-shaped loop 13 by means of which the fastener may be connected to a swivel coupler 20, for example. The lower portion of the wire is bent back about two elbows, such as 15 and 16, to form a resilient locking portion 17. The remaining end 14 of the wire is further bent outwardly to form a hook 18.

A guard or keeper is shown in the form of a plate 19 disposed immediately below the yoke-shaped loop 13 and is provided with sleeves 21 and 22 formed on opposite edges thereof adapted respectively to receive the upper end 12 of the wire and the main body portion 11 thereof. In order to securely maintain the upper end of the wire and main body portion thereof within their respective sleeves, the inner edges of the sleeves are secured to the plate and to the wire as by soldering indicated at 23. Immediately below sleeve 21, plate 19 is provided with an inwardly extending hook-like or channel-shaped flange 24 adapted to releasably receive the resilient locking portion 17 with the hook 18 passing over the top edge of the flange. In this position, the locking portion is maintained in a retracted position by the flange against the spring tension inherent in the wire which normally tends to urge the locking portion outwardly. The provision of the hook 18 adds to the strength of the fastener and tends to prevent the locking portion from becoming accidentally disengaged from the flange. The guard or keeper serves to close the yoke-shaped loop and to provide a closed loop 25 on the bottom of the fastener which may be connected to a hook, plug or the like. Further, by positioning the guard immediately below the yoke-shaped loop, a pull exerted on the lower loop 25 will not cause the fastener to slide within the guard.

A supplemental strand of wire 26 is provided having an eye 27 formed at one end thereof and pivotally carried by the yoke-shaped loop. At the free end of the supplemental wire strand, a hook 28 is formed to extend laterally and engage the inner surface of the resilient locking portion below the flange 24 on the guard. In Fig. 1, the unsecured position of the supplemental wire strand is shown in dotted outline and the secured position in solid outline. When in the secured position, the supplemental strand of wire exerts pressure on the hook portion 18, holding the latter firmly down in place and in hooked engagement with flange 24, thereby maintaining the lower loop 25 in a securely closed condition when a sudden pull is exerted thereon.

It has been found in use that this device may not only be easily and quickly attached and detached but the wire formation is simple and economical to manufacture. Further, tests have proven that the fastener will remain closed upon application thereto of forces several times greater than would normally be experienced in actual use.

What is claimed as new and desired to be secured by Letters Patent of the United States is:

1. A snap fastener comprising a length of wire shaped to form an elongated link, the two wire end portions forming one side of the link, a keeper member secured to the other side of the link and extending across the link and also permanently secured to one of said end portions, thereby providing a permanently closed loop at one end of the link, the other of said wire end portions serving to complete a loop on the other end of the link which may be opened, said other wire end terminating in the form of a hook, spring biased in a direction outwardly of the link, said keeper member also having a hook-like portion constructed and arranged to be releasably embraced by said hook to retain the last-named loop closed, and a locking element comprising another length of wire having an eyelet-like end through which said first-named loop passes and having at its other end a transversely directed hook for releasable hooking connection with said second named loop, the midportion of said element when in locking position, resiliently bearing against said first-named hook to retain same in hooked engagement with said keeper portion.

2. A snap fastener having at one end a permanently closed loop-like formation, keeper means secured intermediate the ends of the fastener, and a resilient loop at the other end adapted to spring open when released at the keeper, said keeper and the opening end of the latter loop being formed with releasably interengaging hook-like portions, and a locking element having an eyelet connection at one end to said loop-like formation and having at its other end a transversely directed hook for releasable connection with said resilient loop, the midportion of said element when in locking position resiliently bearing against said interengaging hook-like portions to retain same in engagement.

FERRIS H. CALDWELL.

REFERENCES CITED

The following references are of record in the file of this patent:

UNITED STATES PATENTS

| Number | Name | Date |
|---|---|---|
| 670,105 | Huberty | Mar. 19, 1901 |
| 2,175,060 | Martin | Oct. 3, 1939 |
| 2,264,883 | Lent | Dec. 2, 1941 |
| 2,419,753 | Adair | Apr. 29, 1947 |